United States Patent [19]

Gasper et al.

[11] Patent Number: 4,549,853
[45] Date of Patent: Oct. 29, 1985

[54] POSITIVE DISPLACEMENT PUMP OUTPUT MONITOR

[75] Inventors: Kenneth E. Gasper, Leawood; Raymond G. Ehrhart, Overland Park, both of Kans.

[73] Assignee: Olin Corporation, Cheshire, Conn.

[21] Appl. No.: 595,808

[22] Filed: Apr. 2, 1984

[51] Int. Cl.[4] .................. F04B 21/00; G08B 21/00
[52] U.S. Cl. .................................... 417/53; 417/63; 340/309.15; 340/626; 307/118; 200/81.9 R
[58] Field of Search .................. 417/63, 53, 38, 44; 307/118; 340/309.15, 309.3, 611, 614, 626; 200/81 R, 81.9 R

[56] References Cited

U.S. PATENT DOCUMENTS

| | | | |
|---|---|---|---|
| 1,938,327 | 12/1933 | Green | 200/81 R X |
| 3,042,767 | 7/1962 | Grostick | 200/81 R |
| 3,043,929 | 7/1962 | Guthrie | 200/81 R |
| 3,050,003 | 8/1962 | Edwards | 417/63 X |
| 3,217,309 | 11/1965 | Parker | 340/626 |
| 3,583,528 | 6/1971 | Beukelaer | 340/605 X |
| 3,663,829 | 5/1972 | Broadbent | 307/118 |
| 3,748,656 | 7/1973 | Gray et al. | 340/605 |
| 3,947,836 | 3/1976 | Smith et al. | 340/309.15 X |
| 4,168,415 | 9/1979 | Edwards, Jr. et al. | 200/81 R X |
| 4,257,748 | 3/1981 | Ives et al. | 417/63 |
| 4,309,149 | 1/1982 | McCombs, Jr. | 417/63 |
| 4,359,716 | 11/1982 | Miyamaru et al. | 307/118 X |
| 4,385,217 | 5/1983 | Culbertson et al. | 200/81.9 R |
| 4,468,170 | 8/1984 | Hanset | 417/63 X |

FOREIGN PATENT DOCUMENTS

| | | | |
|---|---|---|---|
| 16002 | 2/1977 | Japan | 417/63 |
| 36453 | 3/1979 | Japan | 417/63 |
| 26290 | 2/1982 | Japan | 417/63 |
| 607655 | 9/1978 | Switzerland | 340/614 |

OTHER PUBLICATIONS

Kent K. Steward, "Depulsing System for Positive Displacement Pumps", *Analytical Chemistry*, vol. 49, No. 13, Nov. 1977, pp. 2125-2126.

Perry and Chilton, *Chemical Engineer's Handbook*, Fifth Edition, Section 6-3 to 6-5 and 6-11 to 6-15.

*Primary Examiner*—William L. Freeh
*Assistant Examiner*—Paul F. Neils
*Attorney, Agent, or Firm*—William A. Simons; Thomas P. O'Day

[57] ABSTRACT

Disclosed is a positive displacement pump output monitor which is employed by (a) passing the discharged fluid from said pump through a pulse receiving chamber, the pressure of said pumped fluid during the discharge stroke of the pump causing a diaphragm in said pulse receiving chamber to be moved outwardly by said fluid; (b) causing the outward concurrent movement of a spring-loaded metal shaft when the diaphragm is moved outwardly; (c) contacting a fixed element with said outwardly moved spring-loaded shaft, thereby causing a time-delayed relay connected to said fixed element to be reset; and (d) causing said time-delayed relay to send an alarm signal to an alarm annunciation means if said relay is not reset within a predetermined amount of time.

6 Claims, 6 Drawing Figures

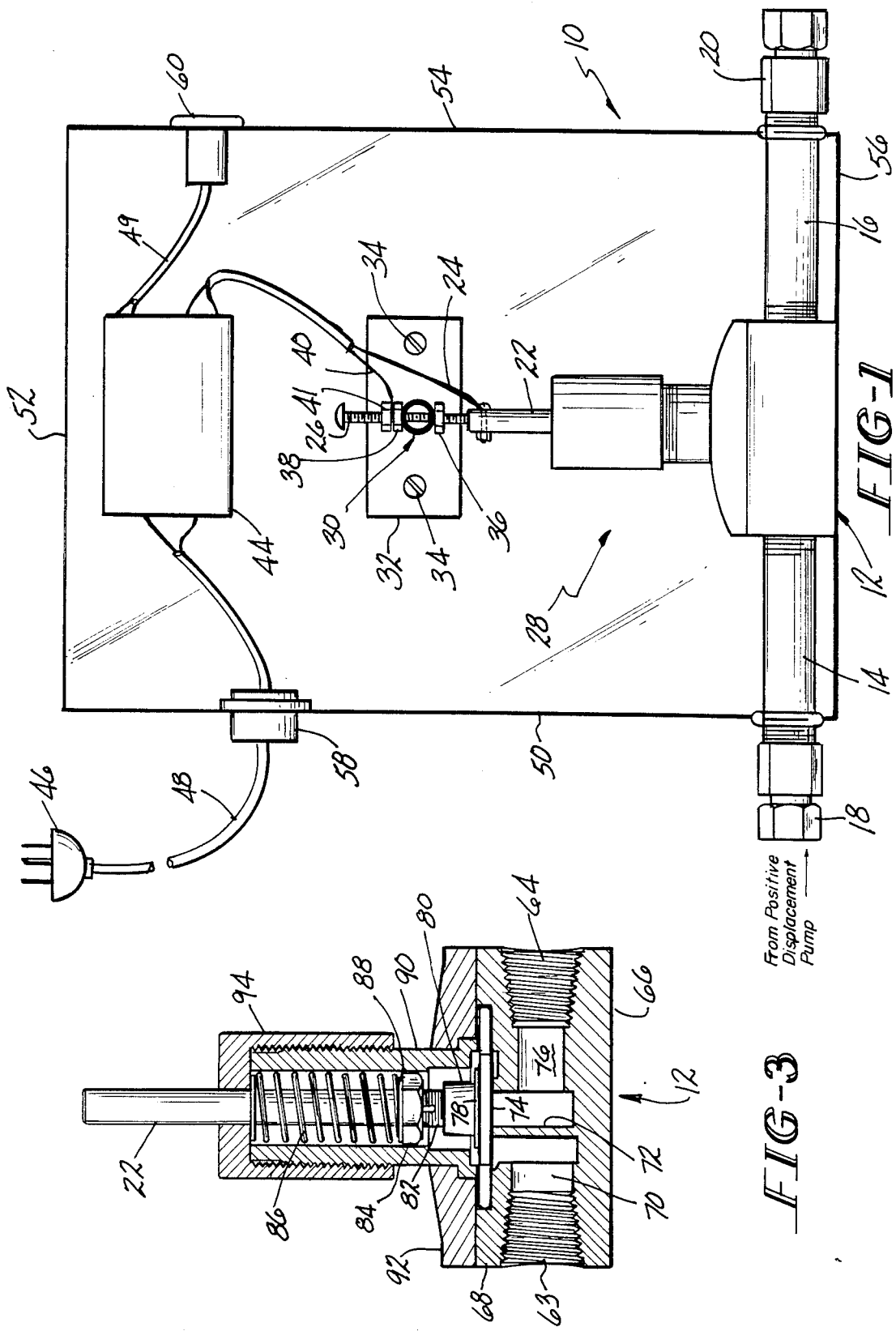

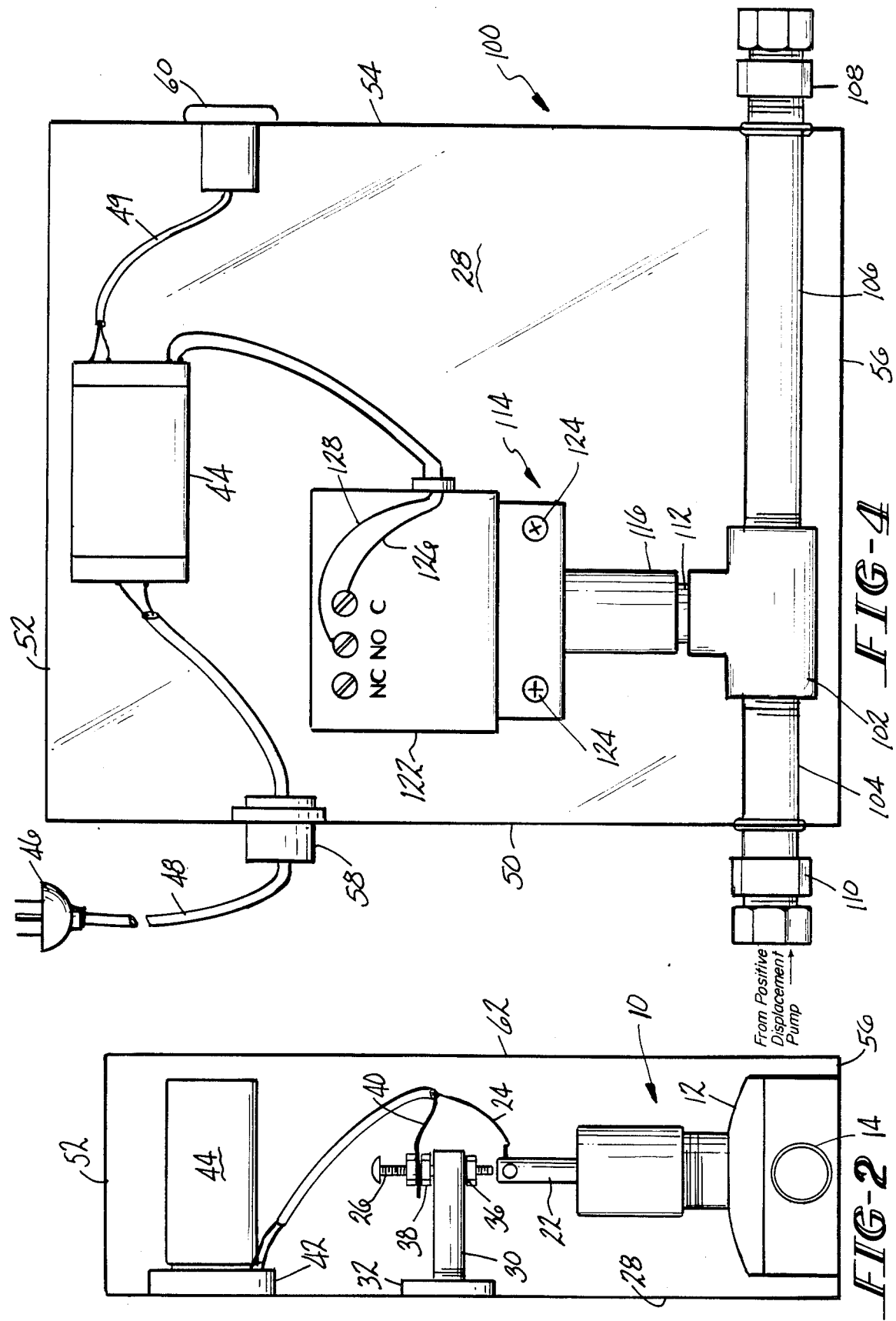

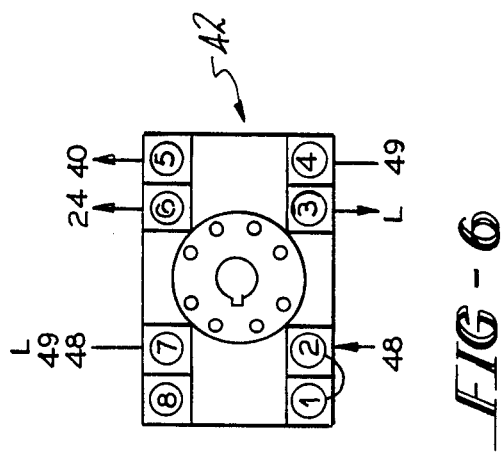
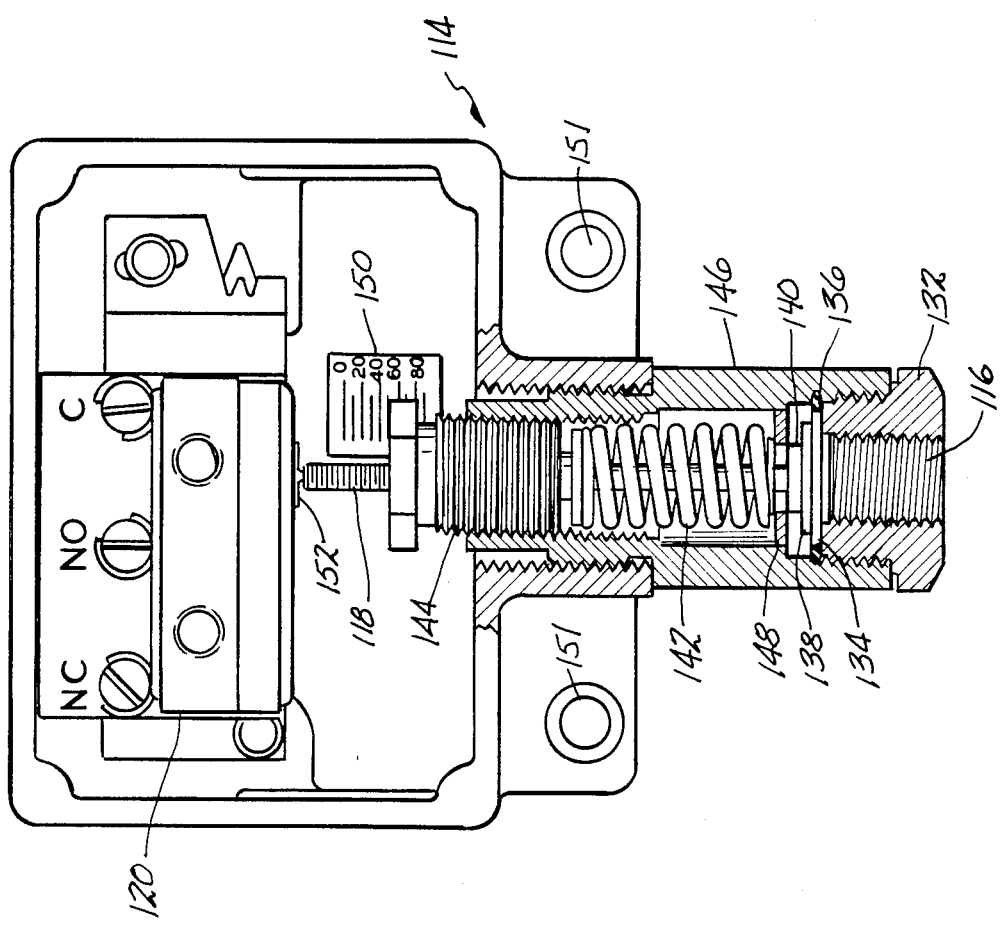

POSITIVE DISPLACEMENT PUMP OUTPUT MONITOR

BACKGROUND OF THE INVENTION

1. Field of the Invention

The present invention relates to an apparatus and a method for monitoring the output of a positive displacement pump. Specifically, the present invention relates to an apparatus and method for monitoring the output from a positive displacement pump including sensing means that is placed in the discharge line from a positive displacement pump and senses each pulse of fluid from the pump and translates the presence or absence of that pulse into an electric signal which may be received and monitored remotely from the pump.

2. Description of the Prior Art

Positive displacement pumps are widely used for adding chemical fluids and solutions to chemical process lines, treatment tanks and the like. These type of pumps operate by causing the discharge of a fluid into an outlet or discharge line during the discharge stroke of the pump.

The total or partial volume of the discharged fluid is replaced in the pump on the return stroke of the pump. These pumps are capable of efficient performance at extremely low-volume through-put rates (e.g. 0.001 gallons per minute).

Positive displacement pumps have their difficulties. They may fail for a variety of reasons, including loss of prime, fouled check valves, and blown fuses. The monitoring of the pump operation may also be quite difficult, especially when very small flow rates are involved. Undetected pump failures may cause process shut-downs or the production of poor quality products or untreated process streams or a combination of these undesirable effects within a short amount of time.

The present invention provides a means of monitoring the operation of positive displacement pumps and providing an alarm whenever a pump fails for whatever reason, even though the flow in the pump discharge line is very small in volume.

BRIEF SUMMARY OF THE INVENTION

The present invention, therefore, is directed to a positive displacement pump output monitor which comprises:

a pulse receiving chamber attached to the discharge line of the pump and through which the pumped fluid passes through, a portion of this pulse receiving chamber comprising a diaphragm capable of moving outward from the fluid in response to the increased pressure of fluid during the discharge stroke of the pump;

a spring-loaded shaft in communication with said diaphragm and which moves outward concurrently with the movement of the diaphragm;

a fixed element which is contacted by said spring-loaded metal shaft when said diaphragm is moved outward by the increased pressure of the fluid during the discharge stroke of the pump;

a time-delayed powered relay connected to said fixed element and when contact is made between the spring-loaded shaft and the fixed element, an electric current is passed to the time-delayed relay to reset said relay, said time-delayed relay is capable of sending an alarm signal to an alarm annunciation means if said relay is not reset within a predetermined amount of time.

The present invention also is directed to the method for monitoring the output of positive displacement pumps comprising (a) passing the discharged fluid from the pump through a pulse receiving chamber, the pressure of said pumped fluid during the discharge stroke of the pump causing a diaphragm in said pulse receiving chamber to be moved outwardly from the fluid;

(b) causing the outward concurrent movement of a spring-loaded metal shaft when the diaphragm is moved outwardly;

(c) contacting a fixed element with said outwardly moved spring-loaded shaft, thereby causing a time-delayed relay connected to said fixed element to be reset; and (d) causing said time-delayed relay to send an alarm signal to an alarm annunciation means if said relay is not reset within a predetermined amount of time.

BRIEF DESCRIPTION OF THE DRAWINGS

FIG. 1 is a schematic illustration of one preferred embodiment of the apparatus of the present invention.

FIG. 2 is a side view of the schematic illustration of FIG. 1.

FIG. 3 is a cross-sectional view of the pulse receiving chamber employed in that preferred embodiment.

FIG. 4 is a schematic illustration of another preferred embodiment of the apparatus of the present invention.

FIG. 5 is a cross-sectional view of the pulse receiving chamber employed by this alternative preferred embodiment.

FIG. 6 is an illustration of a preferred pin assembly of the pin-base socket for the time-delayed relay employed by the present invention.

DETAILED DESCRIPTION

As shown in FIG. 1, positive displacement pump output monitor 10 includes a pulse receiving chamber 12 which is attached to an inlet pipe 14 and outlet pipe 16. Tubing connectors 18 and 20 are attached to the ends of inlet pipe 14 and outlet pipe 16, respectively. These tubing connectors 18 and 20 attach the output monitor 10 to the outlet line of the positive displacement pump (not shown in the drawings). The pumped fluid flows through the outlet line into inlet pipe 14, pulse receiving chamber 12 and outlet pipe 16 before continuing again to the outlet line to the point of discharge.

Within the top portion of pulse receiving chamber 12 is the bottom part of a metal shaft which is spring-loaded. The top portion of this spring-loaded metal shaft 22 is shown projecting from the top of the pulse receiving chamber 12. Attached to this spring-loaded metal shaft 22 is an electric wire 24 capable of passing an electrical current. The preferred means of attachment is merely holding the electric wire in place with a bolt inserted in a hole drilled in the top of spring-loaded metal shaft 22. Spring-loaded metal shaft 22 is capable of moving upward or downward. When it is extended upward, it comes into contact with a fixed metal shaft 26 which is secured to a stationary wall 28 by a plastic or non-conducting retaining material 30. The plastic or non-conducting retaining material 30 is attached to the wall 28 by means of plate 32 and screws 34. The fixed metal shaft 26 is held in place to the plastic retaining material 30 by fasteners (e.g. nuts) 36 and 38. Also connected to the fixed metal shaft 26 is electric wire 40 capable of passing an electrical current. This electric wire is attached to the fixed metal shaft 26 by nuts 38 and 41. Both electrical wires 24 and 40 are attached to the pin-base assembly socket 42 (shown in FIGS. 2 and 6) of a time-delayed relay 44. When spring-loaded metal shaft 22 comes into contact with the fixed metal shaft 26, an electrical circuit is completed and a timing sequence is initiated in the time-delayed relay 44. The time-delayed relay 44 can be set to time-out at any predetermined period of time (e.g. from about 5 seconds to about 1000 seconds or more). Each time the timing sequence is initiated in the relay, the relay is reset and prevented from timing out. The relay is constantly powered by an electrical power source (not shown) through electrical connection means 46 and electric cord 48. The relay is also wired through the electric cord 49 to an alarm signal monitoring and annunciation means (not shown in the drawing) that detects whether the relay has timed out or not and provides an alarm signal if it has timed-out. Accordingly, as long as the positive displacement metering pump is running, the relay will be running and will also be detected by the monitoring and detection means. If the pump should blow a fuse, or fail for any reason, the relay will time-out and indicate an alarm signal to the detection means which provides an alarm signal to the operator. However, the time-out time on the relay can be set high enough so that the pump could regain its prime by itself without a false alarm signal being made.

It is preferred that the pump output monitor be enclosed in a metal, fiberglass, or plastic enclosure having sides 50, 52, 54 and 56 and a cover 62 (shown in FIG. 2) besides a back wall 28 to protect the electric wiring and other monitor parts from the environment. The electric power cord 48 will go through an opening at 58 in side 50 and electric outlet cord 49 goes to outlet plug 60 in wall 54.

In FIG. 2 the pulse receiving chamber 12 is shown in a side view. Inlet pipe 14 is shown entering the bottom of this pulse receiving chamber 12. Spring-loaded metal shaft 22 is shown in the top of the pulse receiving chamber 12. Attached to the spring-loaded metal shaft 22 is wire 24 which is also connected to the pin-base assembly socket 42 of the time-delayed relay 44. Directly above the spring-loaded metal shaft 22 is fixed metal shaft 26. This fixed metal shaft 26 is held in place by means of a non-conducting or plastic retaining material 30 (e.g. PVC) which is connected to wall 28 by means of plate 32 and electrically insulates the fixed metal shaft 26. Retaining material 30 may be bonded or otherwise attached to plate 32. Fixed metal shaft 26 is held in place to the plastic retaining material 30 by means of fasteners (e.g. nuts) 36 and 38. Fixed metal shaft 26 is also connected to the pin-base relay socket 42 by means of electrical wire 40 which is held in place by nuts. This side elevation shows that the monitoring apparatus of the present invention can be enclosed in a fiberglass or other conventional material having a bottom wall 56, a top wall 52 and a cover wall 62 as well as a back wall 28.

FIG. 3 is a cross-sectional view of pulse receiving chamber 12 and spring-loaded metal shaft 22 of FIG. 1. The pulse receiving chamber 12 is shown as a diaphragm housing with a threaded inlet connection 63 and a threaded outlet connection 64 and a bottom portion 66 and top portion 68. The fluid discharged from the pump enters this pulse receiving chamber 12 from the inlet pipe 14 past threaded inlet connection 63 into entering chamber 70 against barrier 72. The fluid is thus forced upward against diaphragm 74 which is then moved upward allowing the fluid to pass over barrier 72 and into exiting chamber 76 and pass threaded outlet connection 64 into outlet pipe 16. The barrier 72 is preferably made of the same plastic (e.g. PVC) material as the rest of the top and bottom pieces of the pulse receiving chamber 12. The diaphragm 74 may be made of any suitable material which is inert to the pumped fluid, yet may be made to move by the pressure of the fluid. One suitable material for the diaphragm 74 is polytetrafluoro-ethylene. Other plastic materials may also be employed, depending mainly on the fluid. Diaphragm 74 has a rubber backing 78 to which it is bonded. This rubber backing is in communication with a ceramic anchor 80 for the spring-loaded metal shaft 22. The screw head 82 and nut 84 are means for adjusting the tension on spring 86. Washer 88 holds the bottom of spring 86 in place. The spring 86 pushes diaphragm 74 and spring-loaded metal shaft 22 down when the pulse action of the fluid ceases. Thus, the spring 86 prevents spring-loaded metal shaft 22 from contacting the fixed element and completing an electric circuit when the pulsing action (and fluid pumping) has ceased. Spring housing 90 and spring housing retainer 92 hold the spring-loaded metal shaft 22 in place. Pressure adjustment nut 94 provides an adjustment means for the spring 86 during operation. The whole assembly for a diaphragm housing 74 and spring-loaded metal shaft 22 as illustrated in FIG. 3 may be obtained from Waltham Chemical Pump Co., 1396 Main Street, Waltham, MA 02154. Their part number for this assembly is #8011-C.

During operation of this embodiment shown in FIGS. 1, 2 and 3, the pump output monitor is installed in the discharge line from the positive displacement chemical metering pump. Soon after the metering pump is turned ON and fluid is transferred through the discharge line into pulse receiving chamber 12, that discharge line and chamber become pressurized (usually after 2 to 6 strokes of the pump). This pressurization will cause a pressure to be exerted against the underside of the diaphragm in the pulse receiving chamber 12. This pressure will cause the diaphragm 74 to be deflected upward.

The spring-loaded metal shaft 22 in communication with diaphragm 74 will be concurrently pushed upward by the extended diaphragm 74 and will then make contact with a fixed metal shaft 26 positioned directly above the spring-loaded metal shaft 22. The physical contact of the spring-loaded metal shaft 22 with the fixed metal shaft 26 will cause the time sequence in the time-delay relay to be reset in an almost continuous way (i.e. once for every pump stroke).

The time-delayed relay 44 should be set for a predetermined amount of time, usually from 15 to 600 seconds. When the spring-loaded metal shaft 22 and the fixed metal shaft 26 make contact, it will initiate the time-delayed relay 44 on its time-delay. The relay will switch contacts and prevent the alarm signal from being sent to the alarm annunciation means. While these two shafts remain in contact, or if the contacts keep occurring within the predetermined amount of time, the relay will be prevented from timing out. When the pump is turned OFF (e.g. by a controller), the discharge line will become depressurized soon after and the contact between the spring-loaded metal shaft 22 and the fixed metal shaft 26 will be broken and the relay will then time out.

When the relay times out, it will switch contacts back to provide an alarm signal to the alarm annunciation means. The alarm signal may be monitored by an operator at the pump location or remotely thereto.

A pin-base relay socket 42 as illustrated in FIG. 2 may be obtained from IDEC Systems & Controls Corp., 3050 Tasman Drive, Santa Clara, CA 95050. Their part number for this socket is #SR2P-05 Socket. This preferred socket is a terminal strip for electrical connections for inlet power line 48, wires 24 and 40, and outlet line 49 to the alarm monitor and annunciation means. It is also an eight pin-base for the time-delayed relay 44. The wiring for this pin-base socket is explained below in conjunction with FIG. 6.

A time-delayed relay suitable for use with this invention may be obtained from SSAC, Inc., P. O. Box 395, Liverpool, NY. Their part number is #TDB-120 AL 4381D Time Delay Relay. This preferred time-delayed relay is a 10 amp relay with a solid state Digi-Set binary DIP switch for adjustable delay on break timing.

FIGS. 4 and 5 show an alternative preferred embodiment of the present invention. As shown in FIG. 5, the positive displacement pump output monitor 100 includes a lower portion (i.e. T-joint) of a pulse receiving chamber 102 which is attached to an inlet pipe 104 and an outlet pipe 106. Tubing connectors 108 and 110 are attached to the ends of inlet pipe 104 and outlet pipe 106, respectively. As in the other embodiment, these tubing connectors attach the positive displacement pump output monitor 100 to the output line of the positive displacement pump. The pumped fluid flows through a pump outlet line into inlet pipe 104, through the lower portion of the pulse receiving chamber 102 and outlet pipe 106 before continuing in the pump outlet line to the point of discharge.

A double threaded pipe 112 connects the T-connection of pulse receiving chamber 102 to assembled housing 114 which contains the upper portion of a pulse receiving chamber 116, a spring-loaded metal shaft 118 (shown only in FIG. 5) and a standard fixed microswitching element assembly 120 (shown only in FIG. 5). This housing is protected by cover 122 which is attached to the assembled housing 114 by screws 124. The microswitching element 120 has three electrical connections thereto-Common (C); Normally Open (NO) and Normally Closed (NC). Electrical wires 126 and 128 capable of carrying an electrical current are attached to the microswitching element, usually at the NO and C connectors. These wires are also connected to pin-base socket 42 (not shown in FIGS. 4 and 5) of a time-delayed relay 44. The relay is constantly powered by an electrical power source (not shown) through electrical plug or connection means 46 and electric cord 48. The relay is also wired through electric cord 49 to an alarm monitor and annunciation means (not shown) that detects whether the relay has timed out or not. This pump output monitor is enclosed in a metal, fiberglass or plastic enclosure having sides 50, 52, 54 and 56, a cover (not shown) and a back wall 28 to further protect the electric wiring and other parts of the monitor from the environment. The electric power cord 48 will go out an opening 58 in side 50 and an electric outlet cord 49 goes to outlet plug 60 in wall 54.

FIG. 5 is a cross-sectional view of housing assembly 114 shown in FIG. 4. The upper part of the pulse receiving chamber 116 is shown as the inner space of threaded connector 132 which is normally connected to pipe 112 in operation. The pumped fluid enters both the lower and upper portions of the pulse receiving chamber 102 and exerts an upward pressure against diaphragm 134 which is then moved upward. The diaphragm 134 may be made of any suitable material which is inert to the pumped fluid, yet may be made to move by the pressure of the fluid. One suitable material for the diaphragm is polytetrafluoroethylene. Diaphragm 134 is surrounded by an O-Ring 136 to ensure no leaking of the fluid. Diaphragm 134 is bonded to a rubber backing 138. This rubber backing 138 is in communication to base 140 of spring-loaded metal shaft 118. Spring 142 is held in place by pressure adjustment nut 144. Spring-loaded metal shaft 118 is held in place by spring housing 146 and housing retainer 148. The spring pressure can be adjusted by means of adjustment scale 150. The cover housing is attached by means of screws in screw holes 151.

When spring-loaded metal shaft 118 is extended upward by the concurrent upward movement of diaphragm 134, then spring-loaded metal shaft 118 comes into contact with microswitch 152 in standard microswitch assembly 120. This microswitch assembly 120 is activated by the upward deflection of the spring-loaded metal shaft 118. An example of a whole housing assembly 114 as illustrated in FIGS. 4 and 5 may be obtained from SOR, Inc., 11705 Blackbob Road, Olathe, KS 66061. Their part number for this diaphragm housing, spring-loaded metal shaft and microswitch assembly is #4PP-K4-NI-C2A Pressure Switch.

While this embodiment employs a steel spring-loaded shaft, it should be noted that the spring-loaded shaft for this embodiment does not have to be metal (i.e. capable of making an electrical circuit). It may be plastic or some other non-metal material.

FIG. 6 shows the wiring into the pin-base relay socket 42 from the other parts of the output monitor. The electric cord 48 from the electrical power source is attached at pins 2 and 7. There is a jumper line from pin 1 to power pin 2. Output cord 49 is attached at pins 4 and 7. A small light (L) for the inside of monitor enclosure (not shown in the other FIGS.) may be attached to pins 3 and 7. Pin 7 is the pin for the common wire for the pin relay socket 42. Electrical wire 24 or wire from C on the microswitch assembly 120 is attached to pin 6 and inlet control wire 40 or wire from NO on the microswitch assembly 120 is attached to pin 5.

What is claimed is:

1. An output monitor positioned on the fluid discharge line of a positive displacement pump comprising
   a pulse receiving chamber attached to said discharge line of said positive displacement pump and through which the pumped fluid passes through, a portion of said pulse receiving chamber comprising a diaphragm capable of moving outward from the fluid in response to the increased pressure of the fluid during the discharge stroke of said pump;
   a spring-loaded shaft in communication with said diaphragm and which moves outward concurrently with the movement of the diaphragm;
   a fixed element which is contacted by said spring-loaded metal shaft when said diaphragm is moved outward by the increased pressure of the fluid during the discharge stroke of the pump;
   a time-delayed powered relay connected to said fixed element and when contact is made between said spring-loaded shaft and said fixed element, an electric current is passed to said time-delayed relay to said relay; and said time-delayed relay capable of sending an alarm signal to an alarm annunciation means if said relay is not reset within a predetermined amount of time.

2. The monitor of claim 1 wherein said diaphragm is made of polytetrafluoroethylene.

3. The monitor of claim 1 wherein said fixed element is a microswitch which initiates said electric current to said time-delayed relay when contacted by said spring-loaded shaft.

4. The monitor of claim 1 wherein said spring-loaded shaft and fixed element are both made of a metal capable of conducting an electrical current.

5. The monitor of claim 4 wherein said spring-loaded shaft is connected to time-delayed relay.

6. A method for monitoring the output of a positive displacement pump comprising:

(a) passing the discharged fluid from a positive displacement pump through a pulse receiving chamber positioned on the fluid discharge line of said pump, the pressure of said pumped fluid during the discharge stroke of the pump causing a diaphragm in said pulse receiving chamber to be moved outwardly by said fluid;

(b) causing the outward concurrent movement of a spring-loaded metal shaft when the diaphragm is moved outwardly;

(c) contacting a fixed element with said outwardly moved spring-loaded shaft, thereby causing a time-delayed relay connected to said fixed element to be reset; and (d) causing said time-delayed relay to send an alarm signal to an alarm annunciation means if said relay is not reset within a predetermined amount of time.

* * * * *